United States Patent [19]
Wiggers

[11] Patent Number: 5,892,981
[45] Date of Patent: Apr. 6, 1999

[54] MEMORY SYSTEM AND DEVICE

[75] Inventor: Hans A. Wiggers, Saratoga, Calif.

[73] Assignee: Hewlett-Packard Company, Palo Alto, Calif.

[21] Appl. No.: 729,261

[22] Filed: Oct. 10, 1996

[51] Int. Cl.⁶ ............................................. G06F 13/00
[52] U.S. Cl. ...................................... 395/878; 711/169
[58] Field of Search ........................... 395/878; 711/169, 711/167, 168

[56] References Cited

U.S. PATENT DOCUMENTS

| | | | |
|---|---|---|---|
| 4,604,717 | 8/1986 | Kaplan | 364/569 |
| 4,998,262 | 3/1991 | Wiggers | 375/107 |
| 5,131,084 | 7/1992 | Kassashima et al. | 395/325 |
| 5,237,674 | 8/1993 | Mohme | 395/425 |
| 5,282,421 | 2/1994 | Marsh | 102/217 |
| 5,359,722 | 10/1994 | Chan | 395/425 |
| 5,361,277 | 11/1994 | Grover | 375/107 |
| 5,408,506 | 4/1995 | Mincher et al. | 375/356 |
| 5,452,228 | 9/1995 | Arakawa | 364/489 |
| 5,561,825 | 10/1996 | Yamagami | 395/878 |
| 5,646,904 | 7/1997 | Ohno | 365/233 |

FOREIGN PATENT DOCUMENTS

1158739  12/1983  Canada ................................. 340/92

Primary Examiner—Eric Coleman
Attorney, Agent, or Firm—Marc P. Schuyler

[57] ABSTRACT

This disclosure provides a memory system and device for synchronizing response across multiple memory devices, whether arranged serially upon a single data bus, in parallel across multiple data busses, or both. A memory controller periodically configures the system by separately placing each memory chip into a configuration mode. While in this mode, the chip is polled by the controller along the corresponding data bus, and the chip responds with a reply. The controller uses this reply to compute elapsed time between polling and the reply. Using all of the chips, the controller determines the maximum response time, in terms of elapsed clock cycles. Based on this maximum time, and the individual response times for each chip, the controller then programs each chip with a number which defines chip-based delay for responses to data read operations. In this manner, successive data reads can be performed on successive clock cycles without awaiting prior completion of earlier data reads. In addition, in a multiple data bus system, the controller is not delayed by having to wait for all simultaneous data reads across a wide bus. The disclosure provides a memory system for dealing with response skew over integer clock cycles and can be used with other systems for synchronizing clock cycle phase across multiple memory devices, for example, as set forth by U.S. Pat. No. 4,998,262.

29 Claims, 3 Drawing Sheets

MEMORY SYSTEM AND DEVICE

This disclosure relates to a memory system and device and, more particularly, provides a method of synchronizing response from memory chips.

BACKGROUND

As computers and their central processing units ("CPUs") become capable of executing instructions more rapidly, this ability carries with it a need for increased memory size and speed, and also bus size. The need has given rise to much design effort directed toward optimizing current and future memory device designs to provide quick memory response. Commonly-recognized current examples of memory devices include dynamic random access memories ("dRAMs"), read only memories ("ROMs") and synchronous random access memories ("SRAMs"), as well as mechanical and optical devices, such as CD-ROMs.

In performing a typical data read operation, a memory controller (usually the CPU or a dedicated memory controller in larger systems) sends a read command to a particular memory chip. This command is propagated to the chip along one or more lines of a command bus. When received by the particular chip, the command causes the chip to locate and direct an output from its internal memory array onto a data bus, as a return data signal intended for the memory controller. The output then propagates along the data bus, which may or may not travel the same route as the command bus. In the example just given, there are four sources of time delay, including the propagation time of a read command from the controller to the chip, the time required for the chip to power its internal registers and channel the proper output onto the data bus, and the time required for propagation of the output back to the controller. The fourth source of time delay, present in systems which have split data busses (e.g., with separate, parallel data busses carrying bit-groups of different significance), is controller delay caused by slow retrieval along one of the parallel data busses. Typically, design efforts have focussed only on reducing the second of these times, that is, on improving internal routing and processing of instructions within memory chips.

The design efforts mentioned above, however, while continually providing more responsive memory devices, do not enable synchronization across multiple busses, nor do they eliminate the possibility of simultaneous bus contention among multiple memory chips, a problem explained with reference to FIGS. 1 and 2.

Bus Contention.

Figure 1:
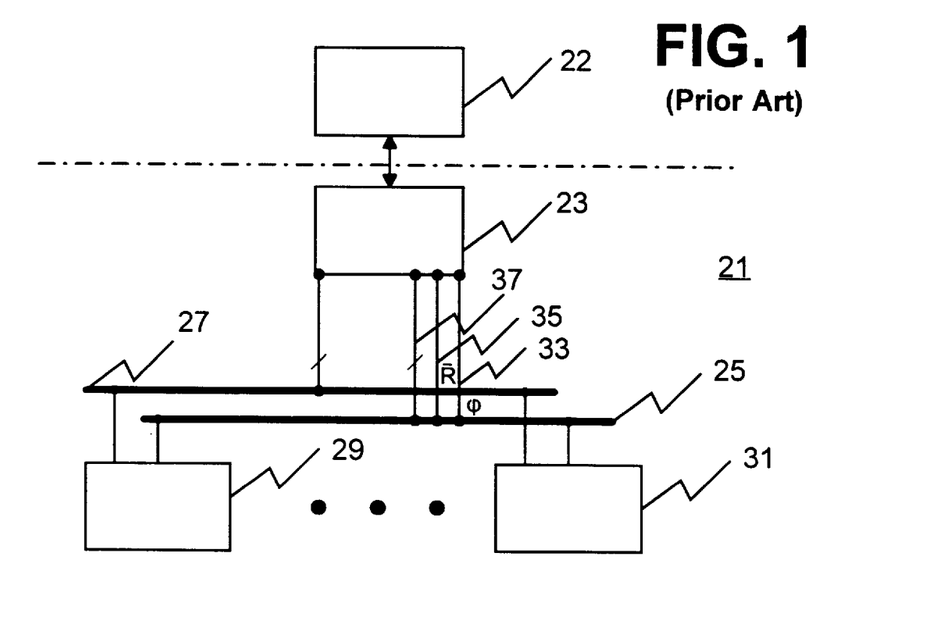
FIG. 1 is a block diagram of one hypothetical memory system used to illustrate the prior art; a broken line separates a computer's central processing unit ("CPU"), which is above the line, and a memory system, located below the line.

FIG. 1 illustrates a hypothetical memory system 21 which is accessed by a CPU 22. The memory system 21 includes a memory controller 23, a command bus 25, a data bus 27, and two memory devices 29 and 31 which are, in the example of FIG. 1, RAM chips. The command bus includes a system clock signal 33, issued by the controller, a data read signal 35, and an address bus 37. Each of the RAM chips 29 and 31 are presumed to be at different distances from the controller 23 from the standpoint of bus wiring, such that commands take a slightly different amount of time to reach each chip. FIG. 2 provides timing diagrams for purposes of explaining the problem of simultaneous bus contention.

It is desired for the memory system 21 to operate as quickly as possible, so the controller 23 will issue three data read commands on consecutive clock cycles; the first and third of these commands are directed to each of the aforementioned RAM chips 29 and 31, and the second command is unimportant to the present discussion and, so, it is indicated by a dash (-). It is presumed that the system clock has a frequency of 250 megahertz, so the width of each square pulse of FIG. 2A has an associated "high" time of 2 nanoseconds. FIG. 2B illustrates the issuance of two data read operations 39 and 41 by the memory controller, respectively labeled "X" and "Y," which then propagate along the command bus toward their intended RAM chip destinations.

Figure 2:
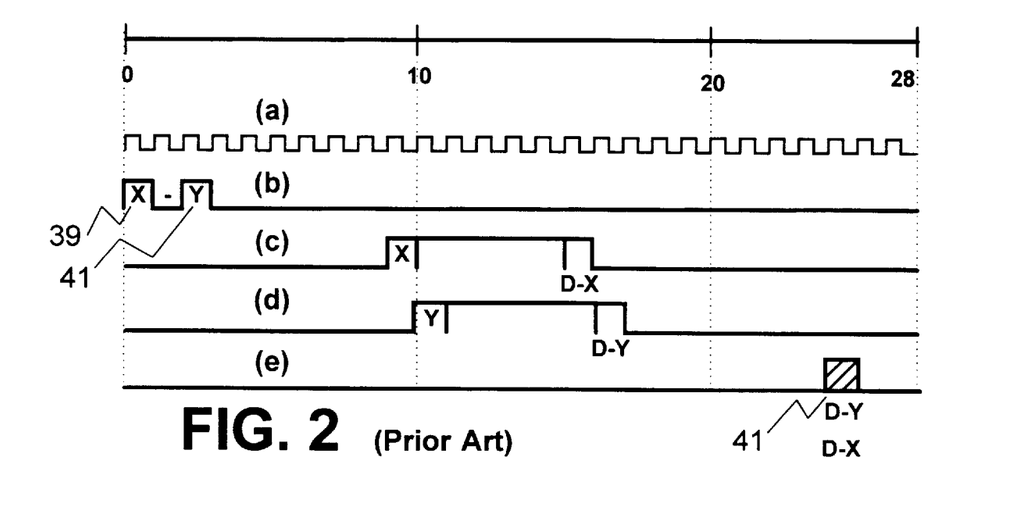
FIG. 2 is a series of timing diagrams used to illustrate the problem of bus contention between multiple memory devices, in the hypothetical prior art system of FIG. 1.

FIG. 2C indicates timing of command "X" response by a first one 29 of the RAM chips, whereas FIG. 2D indicates timing of command "Y" response by the second one 31 of the RAM chips. The first chip 29, as indicated by FIG. 2C, receives its command "X" 8 clock cycles after it has been propagated, and beginning on the ninth clock cycle, takes 20 nanoseconds to retrieve and place its output "D-X" onto the data bus. By contrast, the second chip 31, as indicated by FIG. 2D receives its command "Y" only 7 clock cycles after it has been propagated, and it also takes 20 nanoseconds to place its output "D-Y" onto the data bus. If the output for each RAM chip 29 and 31 takes the same amount of propagation time to return to the controller as was the case for the commands to originally reach the RAM chips, then both outputs "D-X" and "D-Y" will arrive at the controller 23 at the same time, as indicated by a hatched block 43 of FIG. 2E. It will be noted that the address bus and data bus have been indicated, in this example, to have similar propagation times associated with them, though this result will not necessarily be the case in memory system designs in which the command bus and data bus are separately routed. Further, while only two memory devices are indicated above, it will readily be seen that the problem of bus contention is particularly complicated as the number of memory devices is increased, and as CPUs become more and more efficient, operating at multi-hundred megahertz frequencies and greater.

There exists a definite need for a memory system which permits simultaneous response along multiple, parallel data busses. Also, there exists a definite need for a system that avoids simultaneous bus contention between multiple memory devices along one data bus. Preferably, such a system would address situations where propagation times for reaching individual chips may differ by an entire clock cycle or greater. By avoiding multiple device bus contention, it is hoped that memory controllers, such as CPUs and dedicated memory controllers, can perform data read and write operations on consecutive clock cycles, thereby keeping pace with CPU design, and the tendency toward increased computer speed and memory capacity. The present invention solves these needs and provides further, related advantages.

SUMMARY OF THE INVENTION

The present invention provides a memory system and device that fulfills the needs mentioned above; it provides a memory system where individual memory devices (such as micro-chips) can be delayed in operation to provide data outputs to a controller, such as a CPU or memory controller, a predetermined time after a request for data is made. Consequently, the CPU or memory controller does not have to wait until a first data read is completed prior to beginning a second data read. Also, the system facilitates use of a scalable data bus, since memory chips feeding parallel 8-bit or other size data busses can be delayed to provide simultaneous response to a CPU, notwithstanding differences in wiring and bus routing. As can be seen therefore, the present invention provides a memory system with substantial utility.

A first form of the invention provides a memory system having a controller and at least two memory devices, with at least one data bus coupling the controller with each memory device. The controller sends a command to both of the memory devices, which provide a reply back to the controller. When sending a command, the controller begins timing, and awaits receipt of the reply, when the controller is able to determine an elapsed time. Once this is done for both memory devices, the controller determines a maximum travel time and adjusts the response time of at least one of the two memory devices.

In this manner, a device built according to the present invention can synchronize response for memory devices (1) across parallel data busses, for example, across four individual 16-bit data busses that make up a 64-bit data bus, to ensure simultaneous response, (2) serially, along one data bus, to avoid bus contention between multiple devices along the same data bus, such that data reads can be performed on successive clock cycles, or (3) both of the above.

To this effect, a second form of the invention provides a memory device having a buffer for delaying operations of the memory device. According to this form of the invention, the memory device receives a system clock and has stored in the buffer a number of clock cycles by which it is to delay the device's output. When a data read command is then received, the device can first begin by counting until the number indicated by the buffer is reached, and then commence data fetch operations. Alternatively, the device can immediately fetch data from an internal memory storage area and delay latching its output onto the corresponding data bus by an amount responsive to the buffer's contents.

In more particular aspects of the invention, the memory device can include a configuration mode which the device is directed to enter by a system controller. The controller preferably writes a configuration command to a mode register of the memory device, which causes the device to monitor the data bus connecting the device to the controller; the device monitors the bus to detect both an input strobe and a predetermined data word from the controller. When the memory device detects this data word, it latches a reply word onto the data bus together with an output strobe, preferably derived locally by the device from the system clock. The controller uses the output strobe to notify it that incoming data on the data bus is valid, and consequently may be used to determine elapsed time. From this elapsed time, the controller determines the delay time suitable to the particular device, and loads it into the device's buffer. Preferably, this result is performed by detecting a maximum of all response times, and by loading into each buffer a number of clock cycles which delays latching of the corresponding chip's output to synchronize response to the maximum time.

In still more particular features of the invention, the device can perform correction to the buffer contents, by accepting a write command from the controller, by counting a difference between time of arrival of the write command itself and write data, and by adjusting contents (the delay time) of the device's buffer, to thereby correct for differences in travel time between a command bus and a data bus.

Other forms of the invention are indicated below and in the claims, and include related systems and methods for performing memory synchronization related to the two forms of the invention discussed above.

The invention may be better understood by referring to the following detailed description, which should be read in conjunction with the accompanying drawings. The detailed description of a particular preferred embodiment, set out below to enable one to build and use one particular implementation of the invention, is not intended to limit the enumerated claims, but to serve as a particular example thereof.

BRIEF DESCRIPTION OF THE DRAWINGS

FIG. 5 is a series of timing diagrams corresponding to a portion of the system of FIG. 3; in particular, FIG. 5 illustrates synchronization of responses from two memory devices.

DETAILED DESCRIPTION

The invention summarized above and defined by the enumerated claims may be better understood by referring to the following detailed description, which should be read in conjunction with the accompanying drawings. This detailed description of a particular preferred embodiment, set out below to enable one to build and use one particular implementation of the invention, is not intended to limit the enumerated claims, but to serve as a particular example thereof. The particular example set out below is the specific implementation of a memory system, in particular, one that is used for to synchronize responses from multiple memory devices, whether arranged along a single data bus, or in across parallel data busses, or both.

Figure 3:
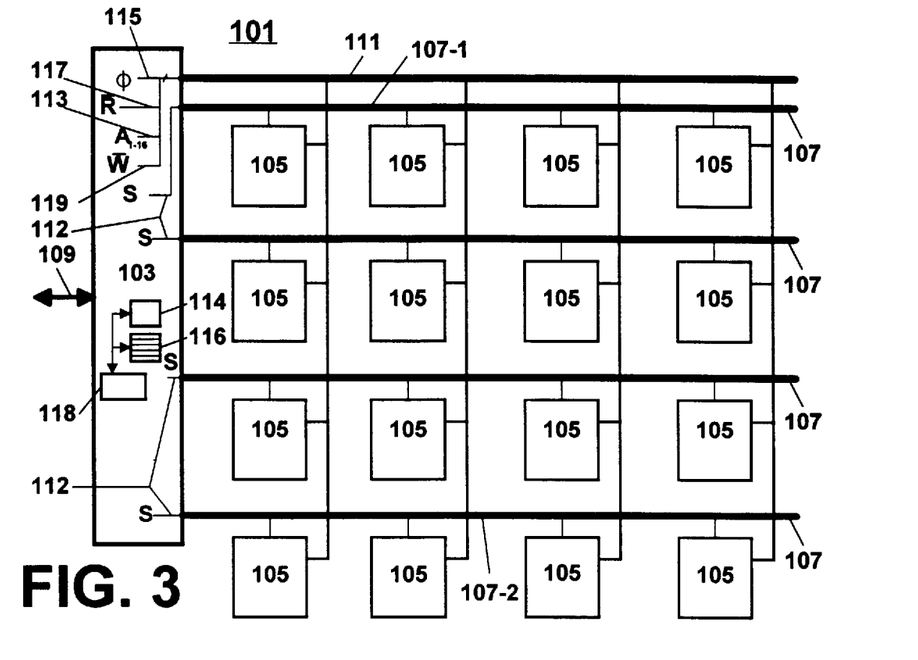
FIG. 3 is a block diagram of the preferred embodiment, which uses both parallel data busses ("baby-busses," which together make up a wide system bus) and simultaneous fetch of words (of 64, 132 or greater bit length) and shared data bus use among multiple memory devices.

In accordance with the present invention, the preferred embodiment is memory system 101, indicated in FIG. 3. A memory controller 103, which may be either a CPU or a dedicated memory controller, accesses numerous memory chips 105 which are arranged both serially and in parallel. In other words, the system includes multiple, parallel data busses, preferably 16-bit data busses ("baby-busses") 107, with several memory devices on each baby-bus. This construction lends itself to a scalable bus system, e.g., in which the system data bus is 64-bits or 132-bits wide, or greater, with the least significant bits of data being retrieved along one baby-bus 107-1, and the most significant bits of data being retrieved along another baby-bus 107-2.

Implementing the features of the present invention, the controller synchronizes memory retrieval both amongst multiple chips 105 along each single baby-bus 107, as well as across the multiple baby-busses. Combined synchronization both across parallel busses and across serially-arranged chips is not necessary to practice the invention as defined by the claims below, and synchronization of memory devices either serially or in parallel, alone, is within the spirit of the present invention. Synchronization across multiple baby-busses 107 is performed in the preferred embodiment to ensure that the controller 103 is not delayed by a slow response along one of the baby-busses 107. Synchronization along each single baby-bus 107 is performed to reduce the possibility of bus contention by multiple chips 105, enabling the controller to perform multiple data reads from different chips 105 on consecutive cycles notwithstanding differences in propagation times along each baby-bus 107.

The controller 103, if it is a dedicated memory controller, receives memory requests along a master bus 109 which couples it to a system CPU (not illustrated). These requests are managed by the controller 103 across all of the baby-busses 107, each one of which may consist of sixteen data lines and a strobe line 112 (to be discussed further below). The controller 103 also uses a single command bus 111 which connects the controller 103 with all memory chips 105. Typically, the command bus 111 will include each of an address bus 113, a system clock 115, a data read signal 117, a data write signal 119, and other lines as well (not shown) such as various interrupt lines, chip select circuitry and the like. Preferably, each memory chip 105 is a random access memory and, specifically, a dynamic random access memory, requiring periodic refresh. Since the memory devices can be affected by temperature, each device 105 is preferably configured both upon system power-up and also at periodic intervals for the purposes of synchronizing memory retrieval.

Each chip 105 includes an input buffer (not seen in FIG. 3) which is loaded with a number after the controller 103 has polled all of the memory chips. The number is derived from a number of elapsed system clock cycles, counted by the controller, corresponding to the slowest chip in the system 101 to respond. Preferably, the controller 103 during the configuration mode separately enables each memory chip 105, by programming a configuration command into a mode register of the chip (seen in FIG. 5, and described below), which then causes only that chip to be active and to enter a mode where it listens to its corresponding baby-bus. When a chip 105 in this mode detects an input strobe (including a predetermined data transmission to it along the data bus), it responsively transmits a predetermined response word back onto the data bus, together with the output strobe 112, which is then used to latch the predetermined response word into the controller 103. Receipt of the output strobe 112 and the predetermined response word indicates to a comparison mechanism 118 of the controller 103 that it should freeze an internal timer, which has been incremented with each system clock pulse elapsed since the controller issued the input strobe, and load that counter's contents into memory internal to the controller, both into a memory spot 114 representing a maximum count (if the counter represents a maximum), and also into a slot 116 dedicated to the particular chip 105. Once the controller has polled all of the memory chips 105, it then calculates an offset for each chip by which each chip is to delay its output, such that data read operations provide data to the memory controller at the maximum response time. In other words, the controller 103 subtracts the response time for each chip from the maximum, to obtain the offset, and it then programs each chip 105 with the appropriate offset.

Figure 4:
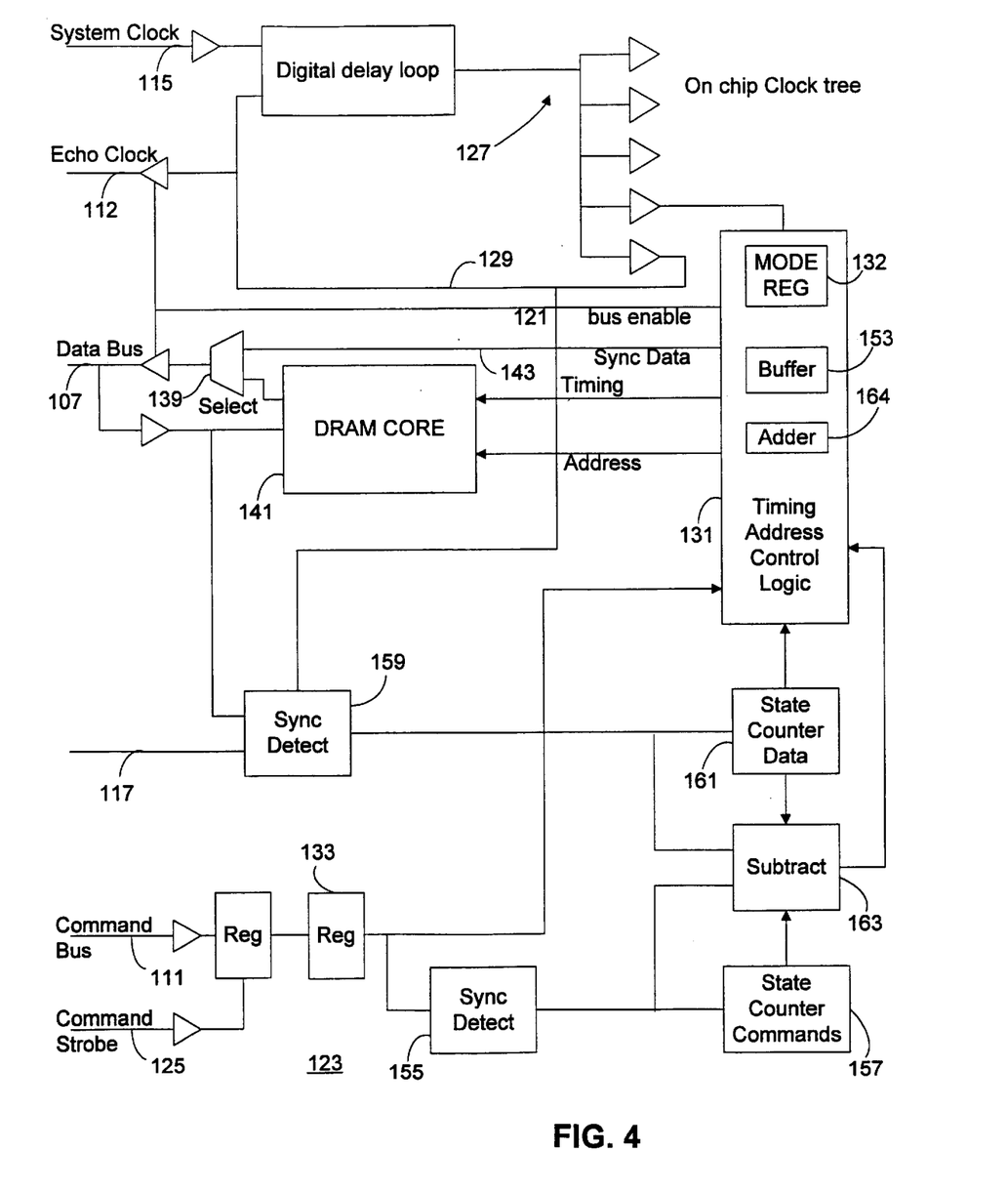
FIG. 4 is a block diagram of a single memory device of FIG. 3; preferably, the device is a dynamic random access memory ("DRAM").

FIG. 4 is a block diagram a single chip 105 from FIG. 3. In particular, the preferred chip is a DRAM 123 which includes an internal delay mechanism 121 for synchronizing memory response with other chips; preferably, this delay mechanism includes an output latch and an internal counter and the internal buffer. The DRAM 123 is coupled to the memory controller 103 via a number of communication paths, including (a) the command bus 111, (b) a 16-bit baby-bus 107, (c) the strobe signal 117, (d) a command strobe 125, (e) the system clock 115 and (f) a chip select signal, not seen in FIG. 4. When the system clock 115 is received by the DRAM 123, an internal phase locking mechanism 127 is used to provide a locally-derived clock signal 129 for timing internal operations of the DRAM and for defining a local time zero for coordinating memory operations.

When it is desired to configure a particular chip, e.g., the DRAM 123, during a configuration mode, the controller 103 enables the specific DRAM, simultaneously disabling all other memory chips along the same baby-bus 107. This enablement is achieved by causing the controller 103 to send a configuration command to the DRAM via the command bus 111, which together with a command strobe, causes the DRAM to latch the command into internal timing and control logic 131. Since the configuration command, as indicated by FIG. 4, must pass through a second latch 133 before it reaches the internal timing and control logic 131, its arrival will be synchronized with the local clock signal 129 of the DRAM 123. The configuration command, for example, may be indicated by the most significant bits only of the address bus, and it does not require transmission of data along the baby-bus 107. These most significant bits are then coupled by the internal timing and control logic 131 into a mode register 132 and used to direct the DRAM 123 to enter the configuration mode.

In the configuration mode, the DRAM will simply monitor the baby-bus 107 for a predetermined data word, which will be accompanied by an input strobe to strobe the data word into a sync detect register 137. In response to detection of the data word, the timing and control logic will immediately cause a predetermined response word to be fed to an output latch 139 from a memory space 141, which the timing and control logic will enable via a sync control line 143. The predetermined response word will thereby be immediately gated back onto the baby-bus 107 and sent to the controller, usually on the local clock pulse immediately subsequent to presentation of the response word to the output latch 139. Accompanied by an output strobe, the predetermined response word is latched into the controller immediately upon receipt, and used to stop the internal timer of the controller's comparison mechanism 118.

Figure 5:
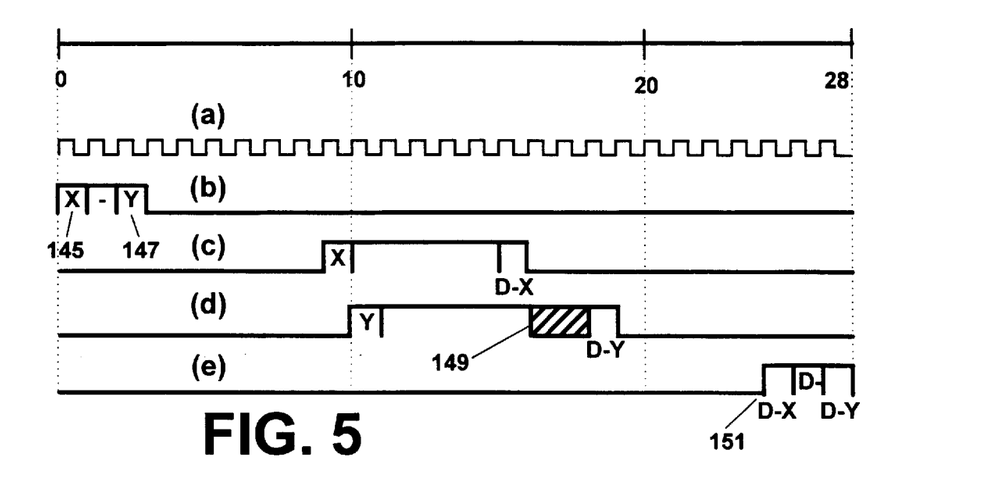

FIG. 5 is used to indicate the results of the controller's determination of a maximum delay time across all of the chips 105 of FIG. 3. In particular, as was the case in connection with FIG. 2, it is desired for the controller 103 of FIG. 3 to perform data reads on successive clock cycles. In this regard, the controller sends data reads "X" and "Y" (designated by the reference numerals 145 and 147 in FIG. 5B) to two different memory devices which are serially coupled to the controller. These devices may consist of single chips 105 along a single baby-bus 107-1, or alternatively, may consist of plural chips coupled to the controller via different baby-busses 107. The data reads 145 and 147 are the first and third reads of a train of three consecutive data reads, with the middle data read indicated by a dash "-" in FIG. 5B. As with FIG. 2, each data read operation has a propagation time associated with it, and the operations arrive at a corresponding memory device in accordance with the corresponding propagation time. However, implementing the principles of the present invention, the memory device associated with command "Y" is programmed with an offset 149 representing a two clock cycle delay. Thus, that memory device will use its local clock to impose a delay of two clock cycles to the output latch (139 in FIG. 4). The offset corrects each individual chip to respond in accordance with the maximum response time for all of the chips, e.g., each chip has its response slowed to be in sync with the slowest chip.

Consequently, presuming that all three of the memory devices are configured in accordance with the present invention, each one of the three data reads will be received on successive clock cycles, as indicated by the reference numeral 151 in FIG. 5E.

Returning to FIG. by the controller programs delay by loading an offset into the DRAM 123; it performs this programming by writing a number of clock pulses into an internal buffer 153 of the DRAM. Subsequently, when the DRAM 123 receives a data read command outside of the configuration mode, it processes the command in the normal fashion. However, when the product of the read command is presented at the output latch, that product is not immediately gated onto the data bus on the subsequent local clock pulse. Rather, the internal timing and control logic 121 withholds enablement of the sync control line 143 to delay output by an amount indicated by the buffer. Preferably, the buffer is combined with a timer for this purpose, which begins a countdown upon the detection of each read command received by the chip.

Importantly, there are a number equivalent implementations of this delay structure that will readily occur to those of skill in the art; for example, offset could be achieved by designing each memory device and the system to provide output at a predetermined clock cycle, but to program a number to make the output available "early" in response to buffer contents. Alternatively, each memory device could have multiple modes, with delay achieved by selecting one of several modes. Alternatively, delay could be implemented by circuit external to each memory device. These environments, as well as other modifications that will occur to those having skill in memory system design, are contemplated as being within the spirit of the present invention.

After the DRAM 123 has been programmed with the offset, the controller preferably calculates a correction which is used to refine the offset. Specifically, in the system of FIG. 3, each data buss (each baby-bus 107) and the corresponding command bus 111 may have different path lengths. Since the offset was originally calculated using polling and reply both over the data bus only (the baby-bus 107), and since read commands are normally issued along the command bus, the offset may not correctly reflect desired delay. Consequently, the correction for each chip is used to refine the delay time associated with each chip 105 to correct this discrepancy, and the correction may differ from chip-to-chip.

To calculate the correction, the controller 103 sends a follow-up write command to each DRAM; the write command includes both the actual command transmitted along the command bus 111, as well as data transmitted along the corresponding baby-bus 107. With reference to FIG. 4, as the command is received by the DRAM 123 from the command, it is provided to a first sync detect circuit 155, which provides an indication of a received command to a command state counter 157. The command state counter 157 then begins counting with each local clock pulse. The data corresponding to the command received from the corresponding baby-bus 107 is also fed to a second sync detect circuit 159, which similarly provides an indication of received data to a data state counter 161. This data state counter 161 also begins counting with each local clock pulse. Thus, receipt of either the write command, or its corresponding write data, will trigger one or the other of the counters 157 or 161 to begin counting. Receipt of both indications from the sync detect circuits 155 and 159 is used to gate, via a subtract circuit 163, a difference in number of clock cycles between command receipt, and an output reflecting this difference is provided to the timing and control logic 131 of the DRAM 123. This difference represents the correction to the offset in number of clock cycles. Thus, depending upon whether the command bus is slower or faster than the data bus, in terms of propagation time, the timing and control logic 131 will modify the contents of the internal buffer 153 accordingly. Consequently, once the offset and correction are calculated, the contents of the internal buffer 153 will thereafter precisely reflect a desired number of offset clock cycles for achieving synchronization across multiple memory devices.

What has been described is a memory system and device for achieving synchronous data reply, at the controller, from many memory devices, such as from DRAM chips. Using the preferred embodiment described above, one may achieve substantially synchronous memory response either from parallel memory devices, e.g., as connected across multiple baby-busses 107, and providing bit groups of different significance for one data word fetch (e.g., for a 64-bit word fetch), or for avoiding bus contention between multiple memory devices coupled to the same data bus, as explained with reference to FIGS. 2 and 4. Notably, the system described herein performs correction for only integer clock cycles, and does not achieve phase correction between different memory chips. The system described herein, however, is compatible with systems for achieving phase synchronization, such as described in U.S. Pat. No. 4,998,262, which is hereby incorporated by reference.

Having thus described an exemplary embodiment of the invention, it will be apparent that further alterations, modifications, and improvements will also occur to those skilled in the art. Such alterations, modifications, and improvements, though not expressly described or mentioned above, are nonetheless intended and implied to be within the spirit and scope of the invention. Accordingly, the foregoing discussion is intended to be illustrative only; the invention is limited and defined only by the various following claims and equivalents thereto.

I claim:

1. In a digital memory system having a controller and at least two memory devices, with at least one data bus coupling the controller with each memory device, the controller also having a system clock by which the controller times its operations, an improvement comprising:

a buffer in each memory device, each buffer adapted to store a number corresponding to an amount of time for which the corresponding buffer is to delay data output;

a routine run by the controller which causes the controller to, for each memory device,
   prompt the memory device for a response, and
   count a number of clock pulses at the controller between prompting of the memory device and receipt of the corresponding response from the controller,
to determine a maximum delay measured by the maximum number of clock pulses needed for response across the at least two memory devices, and
to cause the buffer of each memory device to store a number sufficient to cause data from the corresponding memory device to be received at the controller at the maximum delay time; and circuitry in each memory device that delays data output in response to the number stored in the corresponding buffer.

2. An improvement according to claim 1, wherein the controller is internal to a computer and receives the system clock and generates a local clock in response thereto, and each memory device is a random access memory chip internal to the computer, said improvement further comprising:

an output strobe issued by each chip in response to being prompted, the output strobe being locally derived from the system clock at the location of the corresponding chip and coupled to the controller so as to strobe arrival of a predetermined data word from the particular chip.

3. An improvement according to claim 1, wherein the system bus includes a data bus and a command bus having different path lengths, said improvement further comprising:

a delay configuration mode of each memory device, the delay configuration mode being instructed through the command bus and causing the corresponding memory device to wait for presence of a data signal on the data bus and an input strobe to accept the data, the data signal forming at least part of the prompt from the controller, and issue the response to the controller in reply to the data signal.

4. An improvement according to claim 3, further comprising:

a delay adjustment mechanism within each memory device, the delay adjustment mechanism receiving a command from the command bus and data from the data bus, and calculating a deviation in time to the number for the corresponding memory device, the number correcting for difference in travel time between the command bus and the data bus.

5. An improvement according to claim 1, said improvement further comprising:

arrangement of at least two memory devices on a single, shared data bus.

6. An improvement according to claim 1, said improvement further comprising:

arrangement of at least two memory devices on different, parallel data busses.

7. An improvement according to claim 1, said improvement further comprising:

arrangement of at least two memory devices on single, shared data bus; and arrangement of at least two memory devices on different, parallel data busses.

8. A method of synchronizing response in a memory system which includes a plurality of memory devices coupled to a controller via at least one data bus, wherein the controller performs data read operations from the memory devices according to a system clock, and the data read operations have an associated travel time between the controller and corresponding memory devices, said method comprising:

individually enabling each of the plurality of memory devices along each data bus;

while a particular memory device is enabled, sending a signal to the particular memory device from the controller;

for each one of the plurality of memory devices, sending a reply to the controller in response to the corresponding signal;

counting an elapsed time between sending the signal and receipt of the reply to obtain a response time, for each one of the plurality of memory devices;

in response to the elapsed times for the plurality of memory devices, determining a maximum response time; and causing each of the plurality of memory devices to provide a data read to the controller at a predetermined time from command, selected in dependence upon the maximum response time.

9. A method according to claim 8, wherein at least one of the plurality of memory devices is a chip internal to a computer and includes a buffer and a delay mechanism causing the chip to delay its output by an amount determined in response to contents of the buffer, wherein:

causing each of one of the plurality of memory devices includes loading the buffer of the chip with a corresponding number; and delaying with the delay mechanism an output of the chip in response to the contents of the corresponding buffer.

10. A method according to claim 8, wherein at least one memory device accepts data write commands from the controller and includes a mode register that enables the at least one memory device and causes it to await a polling command from the controller along at least one data bus associated with the at least one memory device, and the memory system further includes at least one command bus coupling the at least one memory device to the controller, said method further comprising:

using the command bus to command the mode register to cause the at least one memory device to await the polling command;

sending the polling command to the at least one memory device, the system controller, in association with sending the polling command, counting system clock cycles;

detecting the polling command at the memory device and responsively sending a reply to the controller;

detecting the reply at the controller and identifying a number of elapsed clock cycles; and computing the number for the at least one memory device therefrom.

11. A method according to claim 10, further using a system clock signal issued via the controller, wherein the at least one memory device is coupled to the system clock signal and provides an internal clock based on the system clock signal, and further, provides a strobe signal as an output, said method further comprising:

issuing the strobe signal in synchronization with issuing the reply; and using the strobe signal to indicate to the system controller that the reply is arriving at the system controller.

12. A method according to claim 8, wherein each memory device further includes a predetermined data word stored internally, said method further comprising:

for each memory device, in response to the signal, coupling the predetermined data word to at least one associated data bus.

13. A method according to claim 8, said method further comprising:

arranging at least two memory devices on a single, shared data bus.

14. A method according to claim 8, said method further comprising:

arranging at least two memory devices on different, parallel data busses.

15. A method according to claim 8, said method further comprising:

arranging of at least two memory devices on single, shared data bus; and arranging of at least two memory devices on different, parallel data busses.

16. A method according to claim 8, wherein each of the plurality of memory devices is a random access memory chip internal to a computer and the at least one data bus is internal to the computer, and wherein individually enabling each memory device includes individually enabling each random access memory chip along each internal data bus.

17. A memory device for use in a memory system having a memory controller and a system bus, wherein the memory controller polls each of several memory elements to determine an associated command response time and determines a desired response time, comprising:
   a memory space wherein data is stored;
   an output path for coupling data from the memory space to the system bus in response to a data read command;
   memory space drivers that accesses data locations within the memory space and that couple contents of selected ones of the data locations to the output path in response to a data read command;
   a clock mechanism that provides a clock signal to synchronize internal operations of said memory device;
   a buffer that stores a number of clock pulses; and
   a delay mechanism coupled to the buffer, the delay mechanism causing delay of at least one of said output path and said memory space drivers by an amount corresponding the number of clock pulses;
   wherein said device is adapted for synchronization with other memory elements, in response to the controller causing the buffer to be loaded with a number that causes equalization of command response time for said device to the desired response time.

18. A memory device according to claim 17, wherein the memory system further includes a data bus and a system clock issued by the system controller, and wherein:
   said device further comprises
      a mode register that is selectively programmed by command from the system controller to cause said device to enter a calibration mode,
      a predetermined response word stored within said device, the predetermined response word being coupled to the data bus in response to a polling command from the system controller, and
      an output strobe of said device, the output strobe being locally derived at said device from the system clock; and
   the calibration mode causes said device to await the polling command and, in response to detection of the polling command by said device on the data bus, to couple the predetermined response word and the echo strobe onto the data bus.

19. A memory device according to claim 18, wherein the system bus further includes a command bus, and wherein:
   said device further receives the number from the system controller and stores it in the buffer; and
   said device further comprises
      a comparison mechanism for comparing time of receipt of at least one signal along the command bus with time of receipt of a corresponding signal along the data bus, and for providing an output, and
      an adder to which the output is coupled, the adder modifying the number by the output to compensate for difference between travel time along the data bus and travel time along the command bus.

20. A memory device according to claim 17, wherein the memory device is a random access memory chip.

21. A memory device according to claim 17, wherein the memory device is a dynamic random access memory chip.

22. A memory system, comprising:
   a memory controller;
   a first memory device having a buffer, and internal delay means for delaying output in response to contents of the buffer;
   a second memory device;
   a system bus coupling one of commands and data between the memory controller with each of the first memory device and second memory device, the system bus having difference in travel times between the memory controller with the first memory device, and the memory controller with the second memory device;
   a calibration mode of the controller, which causes the controller to poll each of the first memory device and the second memory device and to time response from each of the first memory device and the second memory device; and
   a comparison device of the controller, which compares during the calibration mode the timed response from each of the first memory device and second memory device and calculates a number corresponding thereto;
   wherein the calibration mode of the controller causes the controller to store the number in the buffer, such that the internal delay means delays output in response to the number.

23. A memory system according to claim 22, wherein:
   both of the first and second memory devices are coupled to the controller on a single, shared data bus.

24. A memory system according to claim 22, wherein:
   both of the first and second memory devices are coupled to the controller on different, parallel data busses.

25. A memory system according to claim 22, wherein:
   both of the first and second memory devices are coupled to the controller on a single, shared data bus;
   said memory system further comprises a third memory device which is coupled to the controller on a second data bus, different from the shared data bus, the third memory also having a buffer;
   the calibration mode of the controller causes to poll the third memory device;
   the comparison device additionally compares a timed response from the third memory device with time response for at least one of the first and second memory devices;
   the calibration mode of the controller causes the controller to store a second number in the buffer of the third memory, such that the third memory may be synchronized for simultaneous data delivery at the controller with one of the first and second memory devices.

26. A memory system according to claim 22, wherein said memory system is embodied in a random access memory array internal to a computer, the array having a plurality of random access memory chips internal to the computer, and wherein:
   each one of the plurality of random access memory chips has a buffer and internal delay means for delaying output in response to contents of its associated buffer;
   the controller stores a number in each buffer such that data reads are received from each one of the plurality of random access memory chips, notwithstanding any differences in bus propagation time; and
   the controller is adapted to perform plural data read operations from the plurality of chips on successive clock cycles.

27. In a computer system having digital memory that includes a plurality of memory elements, a memory controller that sends data read requests to the memory elements and a common data bus that connects each of the plurality of memory elements with the memory controller, an improvement comprising:

a buffer in each one of the plurality of memory elements for storing a delay time; and a configuration routine operating through the memory controller, the configuration routine determining time required for receipt of data from each of the plurality of memory elements following a data read request, calculating a maximum delay time corresponding to a particular memory element which requires the greatest amount of time to respond to the data read request, determining an offset time for each one of the plurality of memory elements required to cause receipt of data the corresponding memory element at the maximum delay time, such that with the corresponding offset time, data from each one of the plurality of memory elements arrives at the maximum delay time following issuance of a data read request, and causing the offset time for each one of the plurality of memory elements to be stored as the delay time in a corresponding buffer within the memory element;

wherein, using the offset times, each one of the plurality of memory elements responds with substantially similar delay following a data read request, such that data read requests to multiple ones of the plurality of memory elements can be made on successive clock cycles.

28. An improvement according to claim 24, wherein each one of the plurality of memory elements is a dynamic random access memory chip.

29. An improvement according to claim 28, wherein each one of the dynamic random access memory chips and the controller are mounted on a single board.

* * * * *